US006185557B1

United States Patent
Liu

(10) Patent No.: US 6,185,557 B1
(45) Date of Patent: Feb. 6, 2001

(54) MERGE JOIN PROCESS

(75) Inventor: Lee-Chin Hsu Liu, San Jose, CA (US)

(73) Assignee: Unisys Corporation, Blue Bell, PA (US)

(*) Notice: Under 35 U.S.C. 154(b), the term of this patent shall be extended for 0 days.

(21) Appl. No.: 09/135,312

(22) Filed: Jul. 31, 1998

(51) Int. Cl.[7] .................................................... G06F 17/00
(52) U.S. Cl. ............................................. 707/4; 2/3; 2/5
(58) Field of Search .................................. 707/204, 102, 707/200, 201, 4, 526, 2, 3, 1, 104, 5; 711/118, 129

(56) References Cited

U.S. PATENT DOCUMENTS

| | | | |
|---|---|---|---|
| 5,647,058 | * 7/1997 | Agrawal et al. | 707/104 |
| 5,812,996 | * 9/1998 | Rubin et al. | 707/2 |
| 5,822,749 | * 10/1998 | Agarwal | 707/2 |
| 5,937,415 | * 8/1999 | Sheffield et al. | 707/204 |

OTHER PUBLICATIONS

Zhang et al., "Robust 3D head tracking under partial occulusion", Automatic Face and Gesture Recognition, Proceedings, Fourth IEEE International Conference, pp. 176–182, Mar. 2000.*

Dittrich et al., "Data Redundancy and duplicate detection in spatial join processing", Data Engineering, Proceedings, 16th International Conference, pp. 535–546, Mar. 2000.*

Rodrigues et al., "Deadline–constrained causal order", Object–Oriented Real–Time Distributed Computing, Proceedings, Third IEEE International Symposium, pp. 234–241, Mar. 2000.*

* cited by examiner

Primary Examiner—Thomas G. Black
Assistant Examiner—David Jung
(74) Attorney, Agent, or Firm—Charles A. Johnson; Mark T. Starr

(57) ABSTRACT

A merge join process combines rows from an inner and an outer table when the inner table is indexed on a data column that is common to both tables. The merge join process creates a set of rows from the outer table that satisfy a selection criteria and sorts the rows in the set on the common data column if necessary. The merge join process searches for a matching inner row for each outer row in sequence using the inner table indices until it finds a matching inner row on a data page. The data page is then repeatedly searched for matches on the successive outer rows in the set until the end of the data page is reached. The end of the data page is reached when the value of the common data column in an outer row is greater than a last key that represents the highest value of the common data column in a inner row stored on the data page. The merge join process also determines that a matching inner row does not exist in the inner table when the value of the common data column in an outer row is less than a next key that represents the lowest value of the common data column that has not yet been searched for a match. Thus, the next and last keys reduce the number of scans of the data page. All matching inner rows on the data page are marked as join rows; all outer rows with common data column values between the next and last keys but which did not have matching inner rows are discarded. When the end of the data page is reached, another data page is located and the search is repeated. The subsequent data page is located using the inner table indices or by traversing links between data pages.

14 Claims, 5 Drawing Sheets

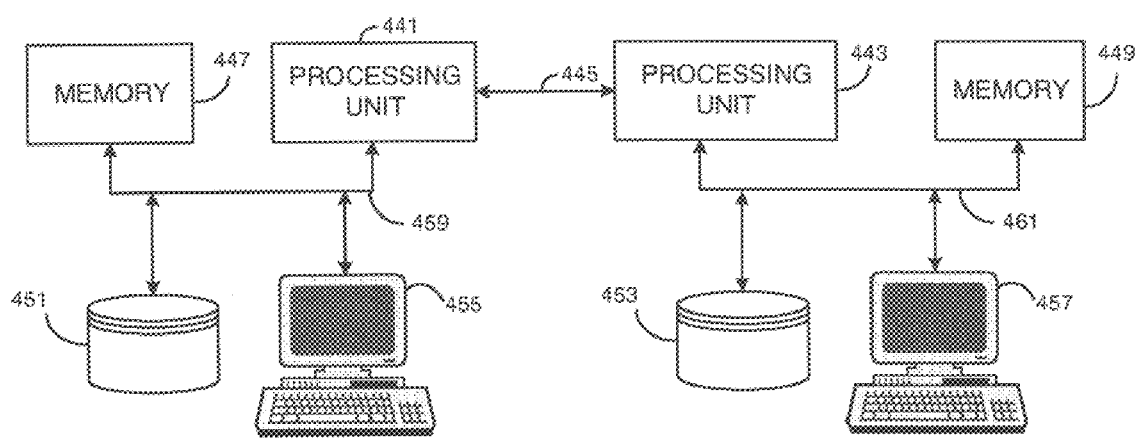
FIG. 4C

MERGE JOIN PROCESS

FIELD OF THE INVENTION

The present invention is related to database systems and in particular to equijoin operations in relational database systems.

BACKGROUND OF THE INVENTION

In a relational database, records are stored as rows (tuples) within tables (relations), with each data field in a record represented as a column in the table. The table data is commonly stored in a balanced tree structure (B-tree), and can be associated with other B-tree structures used to sort the data on selected columns of the row.

Primary key B-trees, which are also called "base tables," are B-trees sorted according to a "primary key" column. For any given table of data, one or more columns of the row is selected as the primary key. The primary key must contain data unique to that row. For example, in a row defined to contain a person's name, social security number, and data of birth, the social security number could be selected as the primary key since this will contain unique data for each row. In a primary key B-tree structure, the top (root) and intermediate nodes of the B-tree are index pages which contain index records that determine how the tree is to be traversed to find the requested data row(s). Each index record contains a primary key value and a page number. The page number indicates the page in the next level of the B-tree that contains records with a primary key value which is less than or equal to the primary key value in the current index record. The bottom (leaf) nodes, or "data pages," contain the data rows. In some B-tree data structures, the data pages are linked together in primary key order so that the data structure can be traversed by following the links from one page to the next.

The user may also decide that it is valuable to create a B-tree on a non-unique "secondary index" column of the table data. The resulting B-tree structure is called a "secondary index B-tree". Although only a single primary key B-tree exists for a given table, multiple secondary index B-trees may be created as the user deems necessary. Like a primary key B-tree, a secondary index B-tree contains root and intermediate nodes that indicate how the secondary index B-tree is to be traversed to find the requested secondary index value. In a common implementation of a secondary index B-tree, the secondary index B-tree does not contain data rows at the leaf nodes. Instead, the leaf nodes contain records which correlate secondary index values to records in the primary key B-tree. The records of the secondary index B-tree records store the primary key values of one or more rows that have the designated secondary key values. The primary key B-tree is searched using these primary key values to retrieve the associated data rows.

A join is a query operation that selects data from one or more tables using a single "select" operation that specifies values for certain column or columns. The specified values are often referred to as the "join attributes" and a column containing a join attribute is a "join column." The rows of data which result from the join operation are created by forming the Cartesian product of the specified tables and eliminating rows that do not meet the specified join selection criteria. For example, assume three tables exist, each containing different information about various people. A join operation using a common join column "name" could be performed on the three tables to combine all information about one person from the three tables into a single row when the person's name is found in all three tables. Joins can also be performed using multiple join columns. For example, a first table could be joined to a second table using a first join column, and a third table could be joined to the second table using a second join column.

A join operation to retrieve rows from multiple tables is the most frequently used operation in a relational database system. It is also the most expensive in terms of computer processing and file input/output (I/O) time, especially when large tables are involved. Join functions are most efficient when the join column is a key for a primary or secondary index B-tree. When all of the tables in the join are not keyed on the join column, the join operation requires full scans of the tables in order to find rows that satisfy the selection criteria, a process which requires a large number of central processor cycles and file I/O's. Additionally, depending on the exact nature of the join operations, full table scans may have to be performed multiple times for a single query.

Join operations fall into two basic categories: an "equijoin" operation in which the selection criteria contains an equality condition, such as requiring a match on one or more join columns common to two tables, as opposed to other join operations specify either less-than or greater-than conditions. In either case, the algorithm that performs the join operation must compare each row in one table with each row in every other table designated in the join operation. In a computer system with insufficient memory to hold all the tables in memory, a join operation becomes quite costly in terms of file I/O time. Equijoin operations are of particular focus for reducing processing costs as they are the most prevalent type of query issued against a relational database in a transactional environment. In addition, equijoins involving only two tables are often employed as the starting point for more complex join operations. Therefore, increasing the speed of equijoins on two tables can dramatically improve the performance of relational database retrievals.

One method used to join rows of two tables is the "sort merge" join. A common sort merge join scans both tables in the order of the join columns. If there are no efficient indices on the join columns to provide the ordering, a sort on either table or both is required. When a row of one of the tables (the "first" table) matches a row in the other table (the "second" table) on the join columns, the sort merge join merges the two rows and returns the combined result. Then the sort merge join reads another row in the second table that might match the same row of the first table. It continues reading rows in the second table as long as there is a match. When there is no longer a match, another row from the first table is read. If the next row in the first table has the same value in the join column as the previous row in the first table, sort merge scans the rows in the second table again and returns the group of rows that matched the previous row in the first table.

If the next row in the first table has a different value in the join column than the previous row, the sort merge join searches the second table until it finds either (a) an row that matches the row in the first table, or (b) an row that has a join column value greater than the join column value of the row in the first table. If (a) occurs, the duplicates matching process described above is performed. If (b) occurs, the sort merge join discards the row in the first table and begins the searching process again for the row that is next in sequence in the first table.

Thus, the sort merge join must scan a group of duplicate rows as many times are there are matching rows in the outer table. Furthermore, because B-tree index pages only indicate the highest and lowest join column values which potentially could occur on a data page, additional searching of a data page is required to determine if a particular join column value does actually exist on the page. Additional scanning and searching means additional file input/output (I/O) operations, which lengthens the processing time for database retrievals.

Therefore, there is a need for an equijoin process that reduces the number of file I/O operations in order to increase the performance of database queries.

SUMMARY OF THE INVENTION

A merge join process combines rows from two tables when one table is indexed on a data column that is common to both tables. The table that is indexed is designated an "inner" table, the other table is designated an "outer" table, and the common data column is designated a "join column." The merge join process creates a set of rows from the outer table that satisfy a selection criteria. The outer rows in the set are sorted on the join column if they are not already sorted in that order. The merge join process then searches for a matching inner row for each outer row in sequence by looping through a series of operations until all the outer rows in the set have been processed. Using index records of the inner table to identify data pages which might contain a inner row matching an outer row, the merge join process searches through the identified data pages until it finds a data page that contains an inner row that matches an outer row on the join column. Each outer row is taken in sequence until one matches an inner row; the merge join process discards any outer rows which do not have a matching inner row.

Once a data page with a matching inner row is found, the merge join process continues to search that data page for matches with the remaining outer rows in the set in sequence until the join column value of one of the outer rows is greater than a last key for the data page that represents the join column value of the last inner row on the data page ("end of the page"). The merge join process also compares the join column of the outer row to a next key for the data page, where the next key represents the lowest join column value that has not yet been searched for a match. If the join column in the outer row is less than the next key, there is no matching inner row in the table and the outer row is discarded without searching the data page. All matching inner rows on the data page are marked as join rows; all outer rows with join column values between the lowest and highest values for the data page but which did not have matching inner rows are discarded. When the end of the data page is reached, another data page of inner rows is located using the index records.

Optionally, the merge join process handles outer rows with duplicate join column values by processing the first of the duplicates to determine if a matching inner row exists. The search is not performed on any of the subsequent duplicates. If a matching inner row is found for the first duplicate, the matching inner row is the join row for all the other duplicates. If no matching inner row is found, all the duplicate outer rows are discarded.

Another aspect of the merge join process operates in conjunction with a primary index structure for the inner table in which the data pages are linked together in primary key order. The primary index records are used to identify the first data page to search for the inner row that matches the first outer row in sequence. Once the end of the first data page has been reached, the merge join process can use the link between data pages to retrieve the next data page in sequence to search for additional matches.

In still another aspect of the merge join process, the inner rows are not stored in join column order on the data page. After finding a first match row on a data page, the merge join process evaluates the join column values for each inner row stored on the data page. The value which is next in sequence after the join column value for the first match row becomes the next key while the value which is greatest of all the join column values becomes the last key.

One parallel version of the merge join process divides the set of outer rows into subsets and assigns each subset to a different computer processor to search for matching inner rows. An alternate parallel embodiment uses one processor to fill buffers with outer rows and a second processor to sort the rows in the buffers.

A specific arrangement of code modules to perform the merge join process is also described.

The merge join process of the present invention is designed to minimize processor time and file I/O when performing equijoin operations on two tables. As long as the outer table join column value is less than or equal to the last key value, the same data page from the inner table will be searched repeatedly. Therefore, the index records for the inner table will not be re-visited until the outer table join column is greater than the last key value on the data page. The combination of the next key and last key allows the merge join process of the present invention to determine that entire ranges of outer rows do not have matching inner rows, thus reducing or eliminating searches of the inner index records and/or the data pages. Furthermore, the merge join process takes advantage of cache memory in a computer system because sorting the outer rows on the join column reduces cache thrashing on the inner index records and so the required index record is likely to be in cache when needed. Since every visit to an index record or a data page potentially involves a file I/O operation, minimizing the traversal of the index records and data pages on mass storage minimizes the number of I/O operations performed, and therefore provides a more efficient search process. In addition, because the merge join process is structurally suited for execution on multi-processor computers, the speed of database queries can be increased through parallel processing.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Merge Join Process

Figure 3:
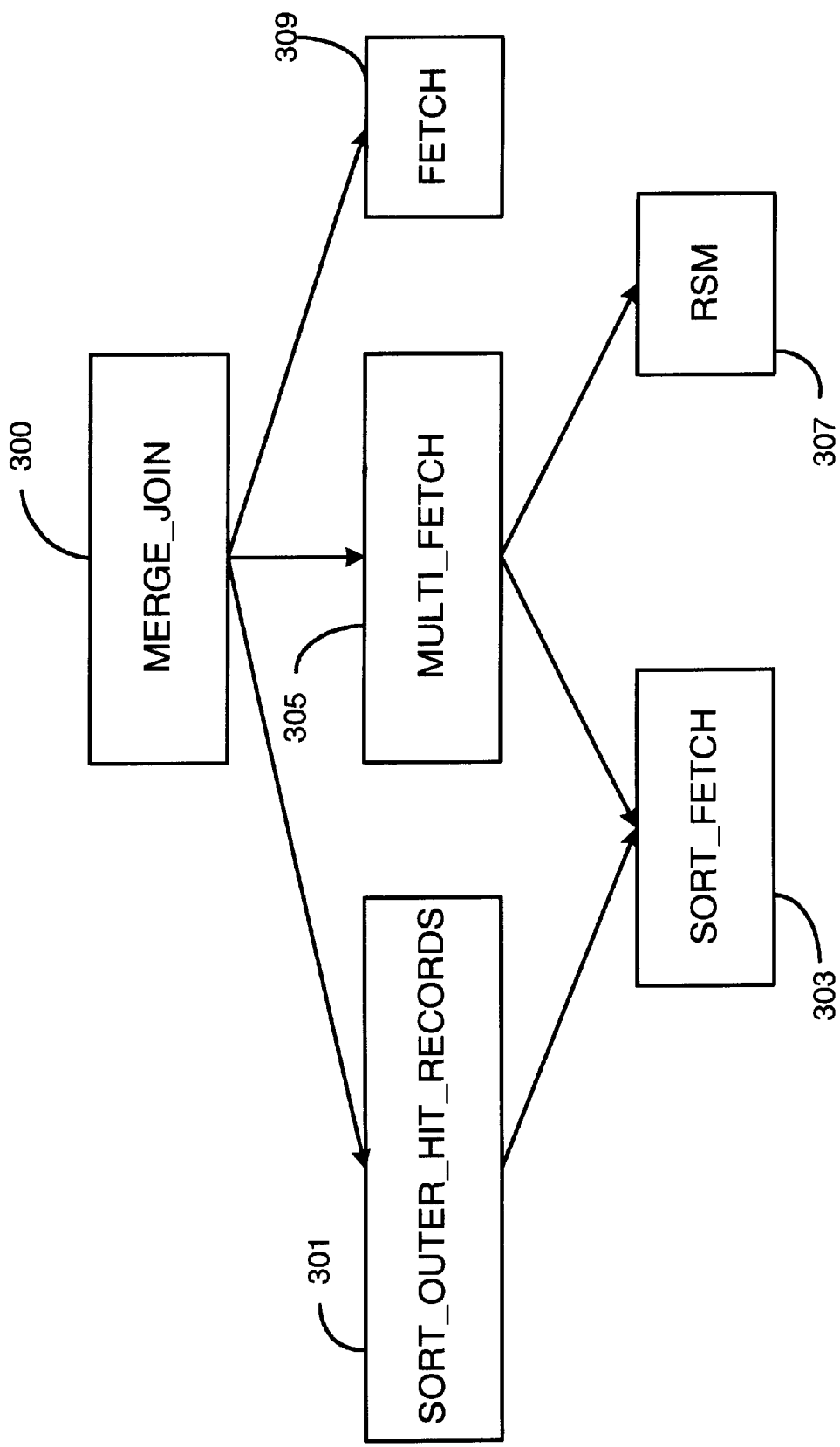
FIG. 3 is a block diagram illustrating code modules used by one embodiment of the merge join process.
Figure 4A:
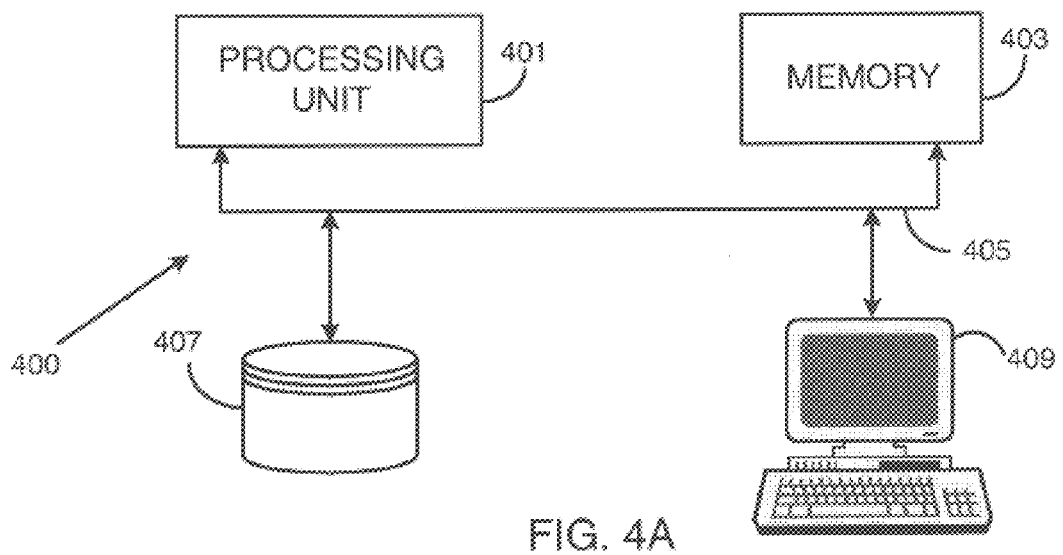
FIG. 4 is a block diagram of operating environments suitable for practicing the merge join process.
Figure 4B:
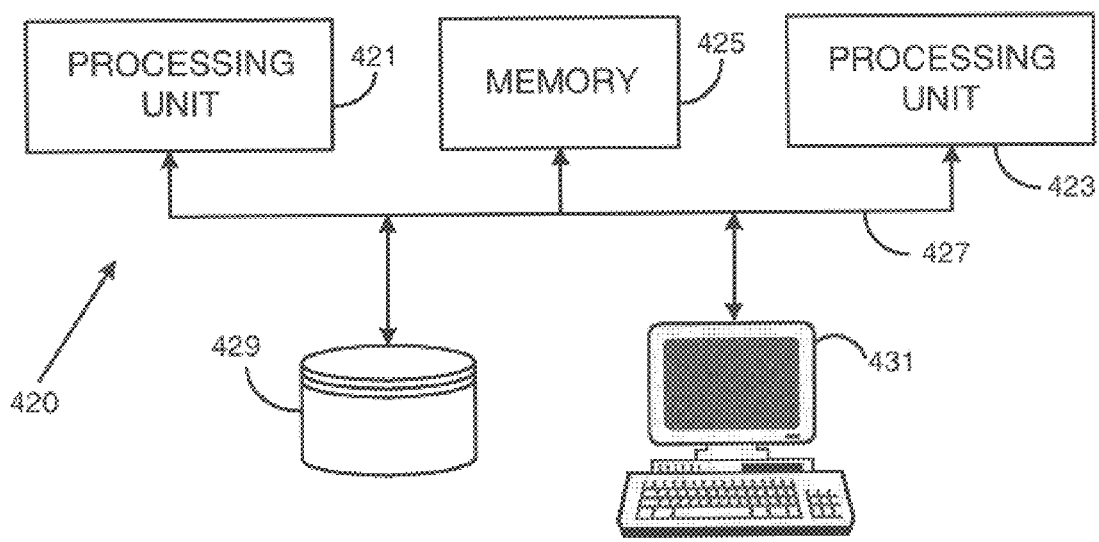

The following description of embodiments for a merge join process is in four sections: a conceptional overview, operations for the process (referring to FIG. 1), logic flow (referring to FIG. 2), code modules (referring to FIG. 3), and operating environments (referring to FIG. 4).

The embodiments of the merge join process are described using relational database terminology familiar to one of skill in the art. Therefore, records are termed "rows" having "columns" which represent data fields in the record. Related rows are stored in "tables" in a binary or balanced tree structure (B-tree). A join operation utilizing the merge join process produces results from combining rows from two tables, called inner and outer tables, when the inner table is indexed on a data column that is common to both tables. The common data column is called the join column and is a key for the B-tree. The B-tree structure consists of at least two levels: one of index pages and one of data pages. The index pages contain index records that determine how the tree is to be traversed to find a requested data row(s). Each index record contains a key value and a page number. The page number indicates the page in the next level of the B-tree that contains records having a key value which is less than or equal to the key value in the current index record. The data pages contain the data rows. The data pages can be linked together in index key order so that, once an initial data page is located using the index pages, the rows in the tree can be traversed in order through the links.

Conceptional Overview

The merge join process creates a set of rows from the outer table that satisfy a selection criteria and sorts the rows in the set on the join column if necessary. The merge join process then searches the B-tree indices for the inner table to find an inner row that matches an outer row on the join column. The merge join process compares the join column of the outer row to a next key. The next key represents the lowest value of the join column in an inner table row that has not yet been searched for a match. If the join column in the outer row is less than the next key, there is no matching inner row in the table and the outer row is discarded without searching the data page.

When a data page is found that contains a matching inner row, the data page is then repeatedly searched for matches on the successive outer rows in the set until the end of the data page is reached. The end of the data page is determined by comparing the value of the join column in each successive outer row with a last key. The last key represents the highest value of the join column in a inner row stored on the data page. If the join column in the outer row is greater than the last key, the end of the data page has been reached. All matching inner rows on the data page are marked as join rows; all outer rows with join column values between the next and last keys but which did not have matching inner rows are discarded. When the end of the data page is reached, another data page is located using the inner table indices, or the data page links, and the search is repeated. The merge join process terminates when all the outer rows in the set have been matched or discarded.

The merge join process is described in detail below in terms of computer-executable processes that operate in a computer system having at least one processor, memory and mass storage. Any standard computer operating environment provides the underlying infrastructure of processing and file input/output (I/O) functions necessary for the execution of the invention. Furthermore, in a parallel computer, the processes can execute in parallel on multiple processors. Operating environments suitable for execution of the hybrid hash join process are described below in conjunction with FIG. 4.

Operations

The operations of one embodiment of the merge join process for an equijoin operation on two example tables is described next with reference to FIG. 1. The two tables being joined are department table 101 and employee table 121. The department table 101 contains department rows 103 and each department row 103 is made up of two data columns, department number 105 and department name 107. The department rows 103 are stored in sequential order by department number 105 on three different data pages 108–110. The department table 101 is indexed on the department number column 105. The B-tree 111 for the department table 101 contains a single top node index page 113 which holds three index records 115, one for each data page 109. Each index record 115 is made up of a key value 117 and a pointer 119 which identifies the data page 111 that holds department rows 105 that is less than or equal to the key value 117.

The employee table 121 contains employee rows 123 and each employee row 123 is made up of two columns, employee number 125 and department number 127. The employee table 121 is sorted on the employee number column 125.

Assume a user requests a list of employees that work in sales and marketing, i.e., departments D1000 and D3000. The merge join process begins by creating a set 131 of employee rows 123 that belong to departments D1000 and D3000 and sorting the set 131 on the department number. Next, the merge join process takes the first employee row 133 from the set 131, in this case employee number 95000, and searches the department table 101 for a matching department row. The merge join process scans the top node index page 113 in the department table using employee 95000's department number of D1000. The scan compares D1000 against the key value 117 in each index record 115 to find the index record 115 with a key value 117 that is less than D1000, i.e., the index page "encompasses" the searched-for department number. The index page 117 that encompasses the department number identifies on which data page the corresponding department row is stored, if it exists. As shown in FIG. 1, D1000 is less than the key value of D1999 in the first index record 115 which points to data page 108. Therefore, the department row for department D1000 is stored on data page 108. The merge join process searches data page 108 for department row D1000 and marks it as a join row for employee number 95000 when found.

A next key for the data page 108 is set to D15000 which is the value of the department number column 105 of the next department row 103 on the data page 108. A last key for the data page 108 is set to D19000 which is the value of the department number column 105 of the last department row 103 on the data page 108. The merge join process then takes the next employee row 133 from the set 131, employee number 94003, for processing. The merge join process determines if the matching department row for employee 94003 exists on the data page 108 by comparing the department number from employee 94003's employee row with the next and last keys. Because department D3000 is greater than the last key in this example, the merge join process returns to the B-tree to determine the data page on which department D3000 is stored. The merge join process retrieves data page 110 which the index page 111 shows is the data page which would contain the department row 103 for department D3000 and searches the department rows for a match. The result 140 of the merge join process is returned when the last employee row 133 in the set 131 has been processed.

If, however, the department number for the next employee row 133 in the set 131 had been greater than or equal to the next key but less than the last key on the data page 108, the merge join process would have searched the data page 108 to find a match. In such a case, the value of the join column of the inner row following a matching inner row becomes the next key. The merge join process continues to search the data page 108 for matching department rows until one of the employee rows 133 has a department number that is greater than the last key for data page 108. Only then does the merge join process re-visit the B-tree index page 111 to find another data page to search.

Additionally, if the department number for the next employee row 133 in the set 131 had been less than the next key of the data page 108, the merge join process would have discarded the employee row as not having a matching department row. Since the B-tree indexing structure in this example stores the department rows in sequential order on the data pages, the next key represents the lowest department number that has not yet been searched for a match with an employee row. Because the employee rows are also sorted sequentially on the department number, each employee row is processed in department number order. Therefore, if a department number for an unprocessed employee row is lower than the lowest unmatched department row, the department row is not in the department table.

Furthermore, in an embodiment in which data pages, such as data pages 108–110, are logically linked in ascending primary index key order, the merge join process can further reduce the number of searches of the corresponding index by traversing the links between pages to find data pages to search. This capability is used when the primary key of the inner table is a compound key that is a combination of non-unique data columns. In such a table structure, multiple inner rows can match an outer row on one or more of the non-unique data columns that make up the compound key, and the matching inner rows can be spread over multiple data pages. The merge join process finds the starting data page for the first outer row join column as described above and traverses the links between the data pages to find all matching inner rows until the last key on a page is greater than the value of the join column of the outer row. The merge join process then begins the search process for the next outer row in sequence. If the value of the join column in the next outer row is less than or equal to the last key on the page, at least one matching inner row (if any exist) will be stored on this page so the search for matching inner rows starts with this page and a search of the index records is not necessary.

Logic Flow

Figure 1:
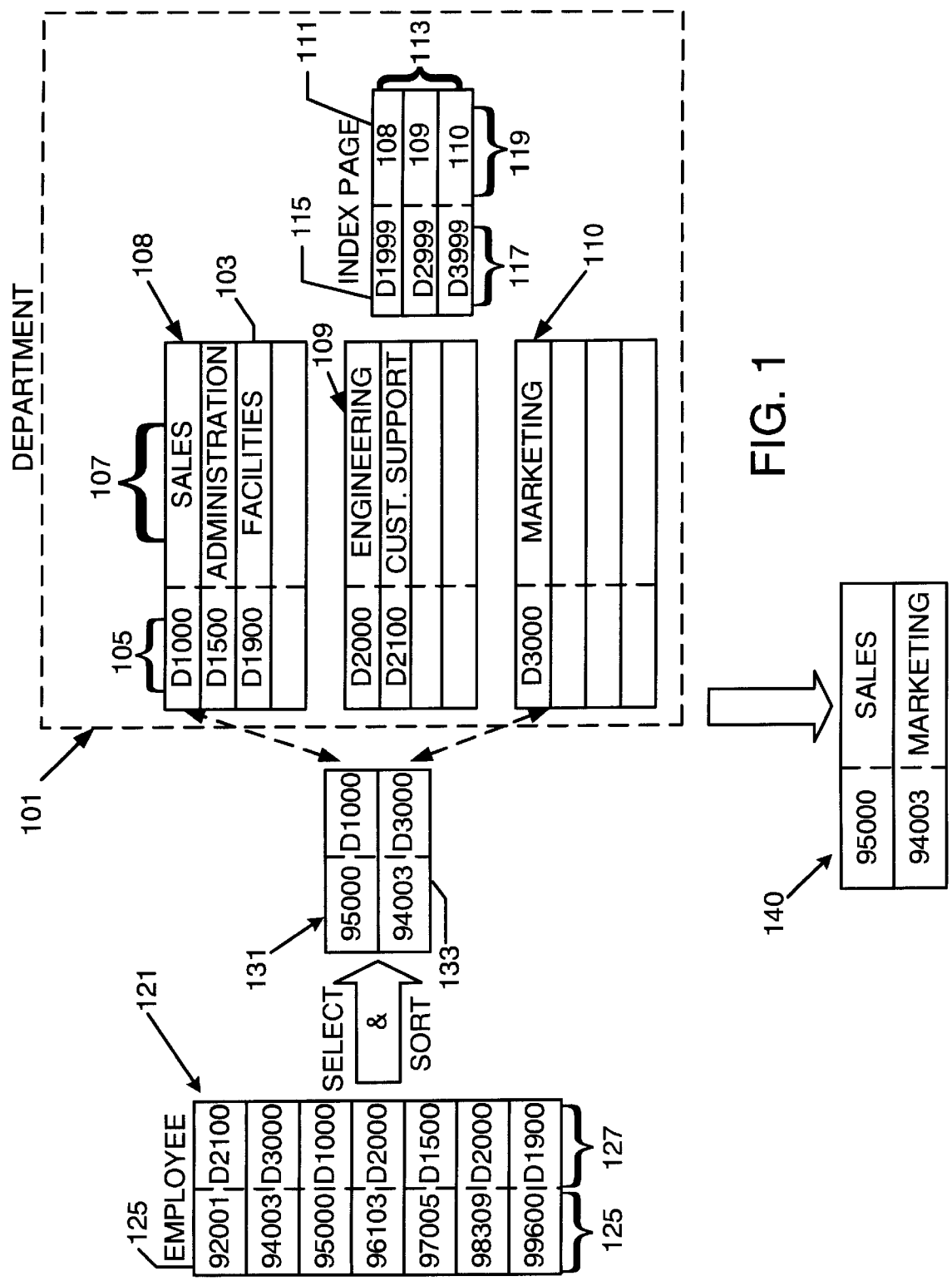
FIG. 1 is a block diagram illustrating an equijoin operation of two tables using one embodiment of a merge join process.
Figure 2:
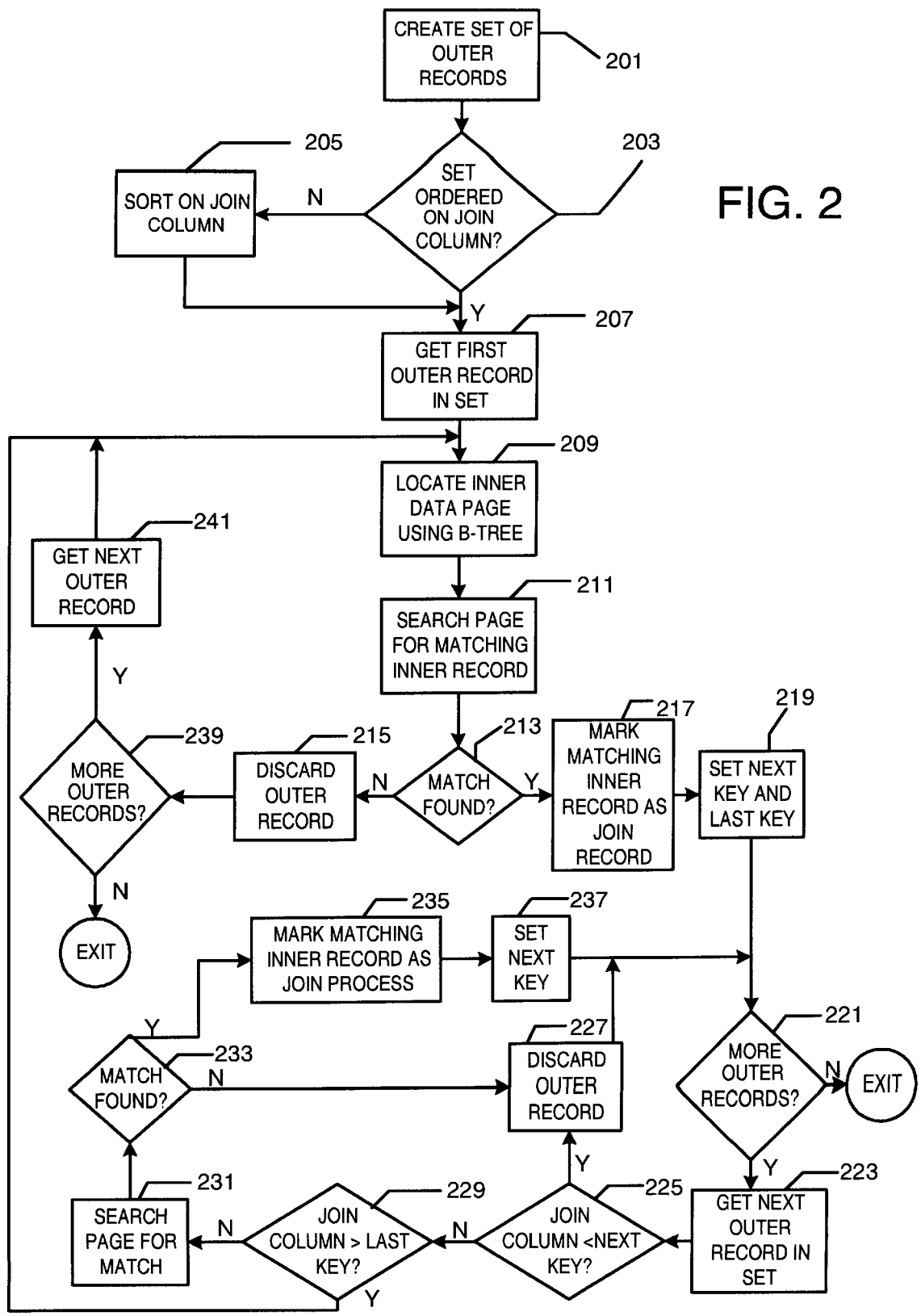
FIG. 2 is a logic flow diagram of the operation of one embodiment of the merge join process.

The processing steps for merge join process described in conjunction with FIG. 1 are now shown in more detail in an operational flow diagram in FIG. 2. As before, the merge join process is performing the join operations for an equijoin of two data tables when one table is indexed on a data column that is common to both tables. The table that is indexed is designated an "inner" table, the other table is designated an "outer" table, and the common data column is designated a "join column."

At step 201, the merge join process starts by creating a set of outer table rows that satisfy a selection criteria. If the set is not already in sequential order on the join column (step 203), the merge join process sorts the set on the join column (step 205).

The merge join process begins searching for join rows using the join column value of the outer row that is first in the set (step 207). The merge join process uses the primary index B-tree of the inner table to locate a data page that potentially contains a matching inner row for the outer row, called a "page-finder" row hereinafter (step 209).

The merge join process then searches the data page for an inner row with a join column value that matches the join column value of the page-finder row (step 211). Such an inner row is called a "first match row" hereinafter. If a first match row is not found on the data page (step 213), the page-finder row is discarded (step 215), the outer row next in sequence in the set (step 241) becomes the page-finder row and the merge join process searches the primary index B-tree again (step 209). If no more outer rows are left in the set to process (step 239), the merge join process exits.

If the first match row is found (step 213), the merge join process prepares to search the data page for further matches by marking the first match row as a join row (step 217). The merge join process also assigns to a next key the value of the join column of the inner row that sequentially follows the first match row on the data page, and assigns to a last key the largest join column value of an inner row that is stored on the data page (step 219). If more outer rows are left in the set to process (step 221), the merge join process gets the outer row next in sequence in the set (step 223) and determines if the outer row has a join column value that is less than the next key (step 225). If so, there is no inner row that matches the outer row, therefore the outer row is discarded (step 227) and the outer row next in sequence is processed (step 221).

If the outer row has a join column value that is equal to or greater than the next key, the merge join process determines if the join column value in the outer row is greater than the last key, i.e., the end of the data page has been reached (step 229). If the end of the page has not been reached, the merge join process searches the data page for a matching inner row, called a "next match row" hereinafter (step 231).

If there is a next match row (step 233), it is marked as a join row (step 235) and the next key is set to the value of the join column of next inner row on the data page (step 237). The merge join process then searches the data page for a next match row for the outer row next in sequence. If there is no next match row, the outer row is discarded (step 227) and the merge join process searches the data page for a next match row for the outer row next in sequence.

If the end of the data page has been reached, there are no more matches on the data page for any of the outer rows in the set that remain to be processed and another data page must be searched. In an embodiment in which the data page are not linked, the index pages of the B-tree are searched to locate another data page using the outer row that caused the end of data page to be reached as the page-finder row (step 209). In another embodiment in which the data pages are linked, step 209 traverses each link to the next page until it finds the data page which should hold the page-finder row.

The search for a next match row can be performed using any of the common algorithms that probe a data page for matching columns. In one embodiment of the merge join process, the searches for a first match row and a next match row both employ a nested loop algorithm In an alternate embodiment, the merge join process handles outer rows with duplicate join column values by processing the first of the duplicates to determine if a matching inner row exists. The search is not performed on any of the other duplicates. If a matching inner row is found for the first duplicate, the matching inner row is the join row for all the other duplicates. If no matching inner row is found, all the duplicate outer rows are discarded.

In one embodiment, the inner rows are stored in join column order on the data page. Thus, the next key is the value of the join column of the inner row physically stored on the data page immediately after the first or next match row, and the last key is the value of the join column of the inner row that is physically stored last on the data page. In alternate embodiment, the inner rows are not stored in join column order on the data page. After finding a first match row on a data page, the merge join process evaluates the join column values for each inner row stored on the data page. The value which is next in sequence after the join column value for the first match row becomes the next key while the value which is greatest of all the join column values becomes the last key.

Code Modules

One skilled in the art will readily perceive that the processes illustrated in FIG. 1 can be implemented using various software programming paradigms with the functions described above assigned among different code modules and the code modules can be of various types such as procedures, subroutines, objects, or the like. FIG. 3 is a block diagram that shows the interrelationship between such code modules in one embodiment of the merge join process.

Procedure merge_join 300 calls procedure sort_outer_hit_records 301 to create a set of outer rows which satisfy a selection criteria and to sort the set on the join column. Procedure sort_outer_hit_records 301 calls procedure sort_fetch 303 to return the first outer row in the set.

Procedure merge_join 300 calls procedure multi_fetch 305 to perform the search for a matching inner row. Procedure multi_fetch calls procedure RSM (relational storage manger) 307 when necessary to get the appropriate data page based on the join column value. Procedure multi-fetch 307 either discards an unmatched outer row, or calls procedure fetch 309 to set the next and last keys for the data page that contains a match and returns the matching inner row. Procedure multi_fetch 305 calls procedure sort_fetch 303 to get the next outer row and searches the same data page which contains the last matching inner row if the join column is less than or equal to the last key for the data page. Procedure multi_fetch 305 also returns a matching rows from the previous match without searching the data page when handling duplicate outer rows.

Operating Environments

FIG. 4 shows three operating environments suitable for practicing the merge join process. Computer 400 has a single processing unit 401 coupled to a memory 403 through a system bus 405. Memory 403 is representative of all types of memory devices standard in a computer system, such as cache memory, ROM, and system RAM. A storage device 407 is coupled to the system bus 405 to store and access computer programs and data on computer-readable media. The media for storage device 407 can be fixed, such as a hard disk, or removable, such as tape. A display device 409 is also connected to the system bus 405. As will be readily apparent to one skilled in the art, the processes of merge join process described above execute within the processing unit 401 from the computer-readable media of storage device 407. The merge join process utilizes the cache memory in the computer system 400 to reduce the amount of time and the number of accesses made to storage device 409 when searching B-tree indices.

Computer 420 is a multi-processor system having two processing units 421, 423 coupled to a shared memory 425 through a system bus 427. The processing units 421, 423 also share a common storage device 429. Computer 440 is also a multi-processor system having two processing units 441, 443 which are coupled through a communications bus 445. Communications bus 445 can be an high-speed system bus, a network bus, or the like. Each processing unit 441, 443 is coupled to non-shared devices, such as memory 447, 449 and storage 451, 453, through an non-shared system bus 459, 461. Multi-processor systems having more than two processing units are well-known in the art and are appropriate operating environments for the present invention.

The merge join process of the present invention is structurally suited for parallel execution on multi-processor systems such as computers 420, 440. Because the outer table is sorted on the join column, the sorted set of outer rows can be divided into subsets and each subset can be assigned to a different computer processor. Since each subset represents a search range, the processors can execute their searches in parallel without interfering with another processor. The join results of all the processors are then combined for output to the user. In still another mulit-processor embodiment, one processor determines which outer rows satisfy the selection criteria, fills a buffer with the selected rows and passes the buffer to a second processor which sorts the rows. The processors perform their tasks in parallel until all the outer rows have been processed. While processing costs are not reduced by parallel operation of the merge join process, the execution time of the query decreases. Additional embodiments of the merge join process suitable for parallel processing will be apparent to one skilled in the art and are within the scope of the invention.

Conclusion

The merge join process described above reduces processor time and file I/O over previous sort merge algorithm when performing equijoin operations on an outer table and an inner table which is indexed on the join column. As long as the outer table join column value is less than or equal to the last key value, the same data page from the inner table will be searched repeatedly. In one embodiment, the index records of the inner table are not re-visited until the outer table join column is greater than the last key value on the data page. In another embodiment, links between data pages reduce the number of searches of the index records that are necessary. The combination of the next key and the last key allows the merge join process of the present invention to determine that entire ranges of outer rows do not have matching inner row, thus reducing or eliminating searches of the inner index records and/or data pages. Furthermore, the merge join process further reduces file I/O because sorting the outer rows on the join column means the required index record is likely to be in cache memory when needed. Since every visit to an index record or a data page potentially involves a file I/O operation, minimizing the traversal of the index records and data pages on mass storage minimizes the number of I/O operations performed, and therefore provides a more efficient search process. In addition, because the merge join process is structurally suited for execution on multi-processor computers, the speed of database queries can be increased through parallel processing.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. In a computer system having at least one processor, a method of joining data rows from an outer table with data rows from an inner table when the inner table rows are indexed on a data column common to both tables, the method comprising the steps of:
   creating from the outer table a set of outer rows that satisfy a selection criteria;
   ensuring the set is sorted on a join column, wherein the join column is the common data column; and
   searching for a matching inner row for each outer row in sequence in the set until all the outer rows in the set have been searched, wherein initially a page-finder row is equated to the outer row first in set sequence, the searching for a matching inner row comprising the steps of:
   identifying an inner table data page based on the value of the join column of the page-finder record;
   retrieving the identified inner table data page;
   searching the inner table data page for a first match row, wherein the first match row is an inner row with a join column value that matches the join column value of the page-finder row, the searching of the inner table data page for a first match row comprising the steps of:
   discarding the page-finder row if no first match row is found; and
   if the first match row is found, marking the first match row as a join row, assigning to a next key the value of the join column of the inner row that sequentially follows the first match row on the inner table data page, and assigning to a last key the largest join column value of an inner row stored on the inner table data page; and
   if a first match is found on the inner table data page, searching the inner table data page until the value of the join column of an outer row is greater than the last key, the searching of the data page for a next match row comprising the steps of:
   selecting an outer row that follows the page-finder row in set sequence;
   discarding the outer row if the outer row has a join column value less than the next key;
   if the join column value of the outer row is not less than the next key, searching the data page for a next match row, wherein the next match row is an inner row with a join column value that matches the join column value of the outer row; and
   if a next match row is found, marking the next match row as a join row and assigning to the next key the value of the join column of the inner row that sequentially follows the next match row on the inner table data page; and
   if the join column value of an outer row is greater than the last key, equating the page-finder row to the outer row with the join column value that is greater than the last key.

2. The method of claim 1, wherein the step of identifying an inner table data page comprises the steps of:
   determining an inner table index record that encompasses the value of the join column of the page-finder row; and
   searching the inner table index record to identify the inner table data page.

3. The method of claim 1, wherein the inner index table data pages are linked and the step of searching the inner table data page until the value of the join column of an outer row is greater than the last key further comprises the step of:
   identifying a next inner table data page to search by traversing the links when all the inner rows on the data page currently being searched have been evaluated and the join column value of the outer row is equal to the last key on the data page currently being searched.

4. The method of claim 1, wherein the step of searching the data page for a next match row further comprises the step of skipping the outer row next in sequence if the join column value of the outer row next in sequence is identical to the join column value of the outer row immediately prior in sequence.

5. The method of claim 1, wherein the computer system has multiple processors and further comprising the steps of dividing the set of outer rows into subsets and assigning each subset to a different processor so that the step of searching for a matching inner row for each outer row is performed substantially in parallel by the multiple processors.

6. The method of claim 1, wherein the computer system has multiple processors and the step of creating from the outer table a set of outer rows that satisfy a selection criteria and ensuring the set is sorted on a join column are performed substantially in parallel by the multiple processors.

7. A computer-readable medium having computer-executable modules for joining data rows from two tables which have a common data column, where one table is an inner table stored in an data structure based on values in the common data column and the other table is an outer table, the computer-executable modules comprising:
   a sort_outer_hit_records procedure for creating a set of outer rows from the outer table sorted on the common data column, wherein each outer row in the set satisfies a selection criteria, the sort_outer_hit_records procedure further for returning an outer row from the set in sequential order;
   a relational storage manager procedure for searching the data structure and returning a data page of inner rows, wherein the data page returned is determined by the value of the common data column in one of the outer row returned by the sort_outer_hit_records procedure;
   a fetch procedure for setting values for a next key and a last key for the data page returned by the relational storage manager procedure; and
   a multi_fetch procedure for receiving the data page from the relational storage manager procedure and the outer row from the sort_outer_hit_records procedure, for determining whether to search the data page based on comparing the value of the common data column of the outer row with the next key and the last key, for performing a search of the data page for an inner row having a value in the common data column that matches the value in the common data column of the outer row, and for discarding an unmatched outer row or returning a matching inner row as a result of the search.

8. The computer-executable modules of claim 7, wherein the relational storage manager procedure searches indices in the data structure.

9. The computer-executable modules of claim 7, wherein the relational storage manager procedure searches in the data structure by using links between the data pages.

10. The computer-executable modules of claim 7, wherein the multi_fetch procedure further determines if the value of the common data column of the outer row duplicates the value of the common data column of a previous outer row and returns an identical matching inner row without further searching the inner table if there is a duplication.

11. A merge join process for joining data rows from two tables which have a common data column, where one table is an inner table stored in an data structure based on values in the common data column and the other table is an outer table, the merge join process comprising:

sorting means for creating a set of outer rows from the outer table sorted on the common data column, wherein each outer row in the set satisfies a selection criteria, the sorting means further for returning an outer row from the set in sequential order;

data storage means for selecting a data page of inner rows based on the value of the common data column in one of the sorted outer rows;

fetch means for setting values for a next key and a last key for the selected data page; and searching means for determining whether to search the selected data page by comparing the value of the common data column of the outer row with the next key and the last key, for performing a search of the selected data page for an inner row that matches the outer row on the common data column, and for discarding an unmatched outer row or returning a matching inner row as a result of the search.

12. The merge join process of claim 11, wherein the data storage means selects the data page using indices in the data structure.

13. The merge join process of claim 12, wherein the data storage means selects the data page by traversing links between data pages in the data structure.

14. The merge join process of claim 12, wherein the searching means further determines when the value of the common data column of the outer row is equivalent to the value of the common data column of a previous outer row and returns the inner row that matched the previous outer row.

* * * * *